(12) United States Patent
Absillis

(10) Patent No.: US 7,590,129 B2
(45) Date of Patent: Sep. 15, 2009

(54) COMPLEMENTARY RESIDENTIAL GATEWAY MANAGEMENT

(75) Inventor: Luc Absillis, Raleigh, NC (US)

(73) Assignee: Alcatel Lucent, Paris (FR)

( * ) Notice: Subject to any disclaimer, the term of this patent is extended or adjusted under 35 U.S.C. 154(b) by 518 days.

(21) Appl. No.: 11/383,781

(22) Filed: May 17, 2006

(65) Prior Publication Data

US 2007/0127506 A1    Jun. 7, 2007

Related U.S. Application Data

(60) Provisional application No. 60/748,022, filed on Dec. 7, 2005.

(51) Int. Cl.
*H04L 12/28* (2006.01)
(52) U.S. Cl. .................. 370/401; 370/352; 370/493
(58) Field of Classification Search ................ None
See application file for complete search history.

(56) References Cited

U.S. PATENT DOCUMENTS

| | | | |
|---|---|---|---|
| 6,871,193 B1 | 3/2005 | Campbell et al. | |
| 7,280,557 B1* | 10/2007 | Biswas et al. | ................ 370/465 |
| 2003/0140193 A1* | 7/2003 | Acharya et al. | ............. 711/112 |
| 2004/0010653 A1* | 1/2004 | Grundy et al. | ............... 710/315 |
| 2005/0030977 A1* | 2/2005 | Casey et al. | ................. 370/485 |
| 2005/0169288 A1* | 8/2005 | Kamiwada et al. | ........... 370/401 |
| 2005/0193103 A1* | 9/2005 | Drabik | ........................ 709/221 |

FOREIGN PATENT DOCUMENTS

JP    2002335273    11/2002

OTHER PUBLICATIONS

Mizuno, et al.; A New Remote Configurable Firewall System for Home-use Gateways; Second IEEE Consumer Communications and Networking Conference; Jan. 3-6, 2005; pp. 599-601.

* cited by examiner

*Primary Examiner*—Phirin Sam (57) ABSTRACT

System management functions are remotely performed on customer premises equipment (CPE), such a residential gateway, even if the CPE has not been authenticated or dynamically allocated an IP address or otherwise is not in a state that enables normal communication with the network. CPE management information is communicated using an IP address identifying a destination CPE but exclusively associated with CPE management. The access node that receives the CPE management information reconfigures the packets to translate the address to a fixed, non-public address. The same fixed address can be shared by all of the CPE's connected to the access node. The CPE recognizes the fixed address as though it were being addressed locally rather than through the network and is therefore able to receive the CPE management information even if the CPE has not been authenticated or dynamically allocated an IP address.

14 Claims, 3 Drawing Sheets

COMPLEMENTARY RESIDENTIAL GATEWAY MANAGEMENT

CROSS-REFERENCE TO RELATED APPLICATION

The benefit of the filing date of U.S. Provisional Patent Application Ser. No. 60/748,022, filed Dec. 7, 2005, is hereby claimed, and the specification thereof incorporated herein in its entirety by this reference.

BACKGROUND OF THE INVENTION

1. Field of the Invention

The present invention relates generally to digital networks and, more specifically, to performing system management functions on residential gateways or similar customer premises equipment in a digital network.

2. Description of the Related Art

Digital service providers are using their networks to deliver an ever-broadening array of services to their subscribers' or customers' homes, businesses or other premises. Whereas once a digital subscriber line (DSL) was used solely to provide subscribers with Internet Web and e-mail access, today's service providers wish to bundle Internet service with voice (telephony) and video (television) services. (Such bundled Internet, voice and video service is sometimes colloquially referred to as "triple play" service.) Optical fiber-based technologies, such as the passive optical network (PON), offer perhaps even more promising alternatives to DSL. Fully optical networks, which some have referred to as "fiber-to-the-premises" (FTTP), are increasingly being developed and deployed.

The interface at the customer premises between the customer's computers or other devices and the service provider network has evolved along with the services and network technologies. The venerable DSL modem (transceiver) is increasingly being supplanted by a device known as a residential gateway. A residential gateway provides a simplified way for a user to connect or bridge a local area network (LAN) to the service provider network.

A residential gateway generally needs to be set up, configured or otherwise subjected to an automated software installation process before it can be used. When the manufacturer or service provider ships a residential gateway to a customer, a CD-ROM or DVD storage disk with installation software is generally included. The customer loads the disk onto his computer, which is connected to one of the residential gateway LAN ports. The computer addresses the gateway through a fixed or static Internet Protocol (IP) address during the installation procedure. The installation software may have a Web browser user interface. Nevertheless, this fixed IP address is generally used only for such local installation or maintenance purposes and is not intended to be remotely accessed through the Internet. The fixed IP address is typically an address selected from one of the three blocks of addresses reserved by the Internet Assigned Numbers Authority (IANA) private internets (local networks): 10.0.0.0-10.255.255.255; 172.16.0.0-172.31.255. As the IP address is only valid for local access, all residential gateways can use the same fixed IP address for installation purposes. In normal use, communicating with the service provider network, the residential gateway typically will dynamically acquire its (Internet-recognized, routable, etc.) IP addresses using the dynamic host configuration protocol (DHCP).

Once a residential gateway has been set up and otherwise installed, it can be used in the normal manner. If a problem arises, or if software needs to be re-installed or reconfigured, the customer may not need to perform those processes, as in many cases the network service provider can remotely (i.e., via the network itself) re-configure software and perform other management tasks upon the residential gateway.

As triple-play service becomes more common, security and convenience considerations will become even more important, and residential gateways are being developed to accommodate those considerations. The more advanced residential gateways will allow a user to connect any of a variety of digital devices to the residential LAN, such as computers, (television) set-top boxes, voice-over-Internet Protocol (VoIP) telephones, IP fax machines, etc. It is important that the user not be unduly inconvenienced by having to perform complicated procedures or tasks to prepare the residential gateway for use. Already, the longstanding username-and-password login procedure for providing network security is being supplanted by automated port-based network authentication, such as that defined by the IEEE 802.1x standard. "Authentication" refers generally to the process by which a network verifies that a residential gateway or other client device attempting to access the network is authorized to access the network and blocks access if the authentication process indicates that the device lacks authorization. Authentication serves a service provider's goals of maintaining control over security and minimizing user inconvenience. The initial setup or installation procedures that currently involve a user loading a disk and running installation software, as well as software upgrading and maintenance procedures, are targets for improvements in convenience.

Failure of the gateway to successfully authenticate when it should have is problematic for the network service provider because it may indicate a residential gateway malfunction. It is similarly problematic for the network service provider when other processes that must occur before a residential gateway becomes operable fail, such as dynamic allocation of an IP address to the gateway. It is possible for a residential gateway to malfunction for a variety of reasons, including configuration errors, a software bug or, in the case of a gateway that has been in prior use, a virus. New software may need to be installed to fix the problem. When authentication, dynamic IP address allocation, or other such processes fail when they should not have, the service provider may consider sending the customer a disk with new software to load or dispatching service personnel to the premises because, without authentication and allocation of an IP address, it is generally not possible for the service provider to remotely perform configuration or other system management tasks on the residential gateway. If dispatched to the customer premises, a service technician can connect a portable diagnostic or service computer to the residential gateway that is perhaps malfunctioning or in need of a software upgrade and communicate through a port using the above-mentioned fixed IP address. A more convenient mechanism for providing such system management and maintenance is clearly needed. Furthermore, especially in triple-play environments, for security and convenience reasons, service providers would prefer that a customer not perform any configuration, setup or installation procedures on residential gateways. Rather, such procedures should be transparent from the customer's perspective.

It would be desirable for a network service provider to be able to remotely perform system management functions on a residential gateway, such as reconfiguring, upgrading or installing software, even in the event of failure of processes that enable the residential gateway to communicate normally with the network. The present invention addresses these problems and deficiencies and others in the manner described below.

SUMMARY OF THE INVENTION

The present invention relates to remotely performing system management functions on customer premises equipment (CPE), such a residential gateway, even if the CPE has not been successfully authenticated or assigned an IP address or otherwise is not in a state that enables normal communication with the network.

In an exemplary embodiment of the invention, it is first determined whether the CPE to which management information is to be communicated is in a state (condition) that enables normal communication with the network (i.e., via a dynamically assigned IP address). If the CPE is not in such a state, CPE management information data packets are addressed to one of a plurality of predetermined management addresses exclusively associated with CPE management. As each management address uniquely identifies one of a plurality of CPE's in the network, addressing the CPE management information data packets to a selected one of the predetermined addresses causes the access node that receives the packets to associate the packets with one of the CPE's to which the access node is physically or logically connected. Before transmitting or forwarding the packets on to that CPE, the access node reconfigures the packets to translate the selected management address to a predetermined, fixed address. The same predetermined, fixed address can be shared by all of the CPE's connected to the access node. The CPE recognizes the fixed address as though it were being addressed locally rather than through the network and is therefore able to receive the CPE management information even though it may not have been authenticated or even allocated an IP address through the normal (e.g., DHCP) process. Once the CPE extracts the management information, it causes the CPE to perform a specified management task, such as updating CPE software.

The fixed address can be fixed by the CPE manufacturer (e.g., via firmware) or provisioned by the service provider that provides the CPE to the customer. The fixed address can be the IP address that has been used conventionally for local installation of software in CPE's by customers. As that IP address is in the private IP address range, and no communication path to this address is established by Internet routers, there is minimal likelihood of unauthorized remote access. In some forms of the invention, additional security features can be included, as set forth below in further detail.

The predetermined management addresses and the translated addresses provide a communication path to the CPE that complements the paths through which information normally moves. In the exemplary embodiment, the access node blocks transmission to the destination CPE of all data packets that are not addressed to one of the plurality of predetermined management addresses (i.e., not transmitted via one of the complementary management paths) until such time as the CPE becomes capable of communicating normally with the network (via a normal communication path as defined by a dynamically assigned IP address and, optionally, other addressing information, such as a virtual LAN (VLAN) or virtual private network (VPN) address). At that time, the access node can disable the complementary management paths to enhance security.

DETAILED DESCRIPTION

Figure 1:
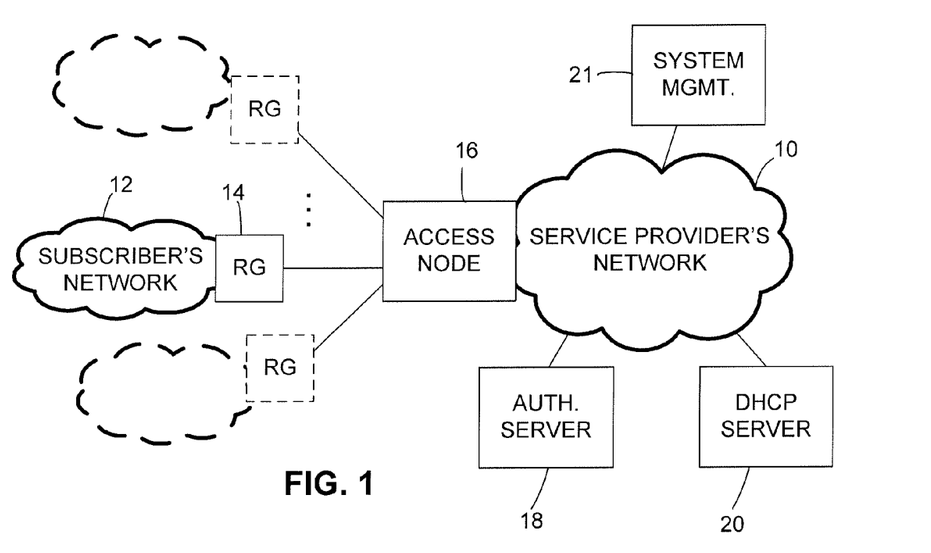
FIG. 1 is a generalized block diagram of a network of a type that carries data between a service provider and subscribers in an exemplary embodiment of the invention.

As illustrated in FIG. 1, in an exemplary embodiment of the invention, a service provider (business entity) operates a service provider network 10 that provides subscribers with services such as Internet (Web, e-mail, etc.) access, voice (telephony) communication, video (television) entertainment, etc. The subscribers are commonly referred to as "customers" of the service provider, as they typically pay the service provider for such services in accordance with a suitable arrangement. Such a service provider network 10 is described for purposes of illustration, and the arrangement on the server side of the overall client-server network can be of any other suitable type in other embodiments of the invention.

Each subscriber, who can be a homeowner, business, or other person or entity, has a subscriber network 12. Subscriber network 12 can be a local area network (LAN) in a residence or other premises. Subscriber network 12 networks together various subscriber-operated devices, such as computers, (television) set-top boxes, voice-over-Internet Protocol (VOIP) telephones, IP fax machines, etc., (not shown individually for purposes of clarity). A residential gateway (RG) 14 or other such customer premises equipment (CPE) links or connects the subscriber network 12 to the service provider network 10. Such a subscriber network 12 is described for purposes of illustration, and the arrangement on the client side of the overall client-server network can be of any other suitable type in other embodiments of the invention.

Residential gateway 14 typically is provided by or at least pre-approved by the service provider and thus considered "authorized" equipment. Thus, in operation, the service provider network 10 performs authentication upon residential gateway 14 in the conventional manner to verify that it is the expected, authorized equipment and not some other (unauthorized) equipment that has been connected in place of residential gateway 14. This authentication process can conform to the well-known IEEE 802.1x authentication protocol.

Service provider network 10 includes an access node 16, an authentication server 18, a dynamic host configuration protocol (DHCP) server 20, and a system management server 21. (An example of such a system management server 21 is what DSL forum technical report TR69 "CPE WAN management protocol" defines as an Auto-Configuration Server or ACS.) Service provider network 10 can include more access nodes 16 and other servers and devices of the types that are commonly included in such a network, but only one network node 16, one authentication server 18, and one DHCP server 20 are shown in FIG. 1 for purposes of clarity. Residential gateway 14 is connected to a physical or, alternatively, a logical port of access node 16, through which it communicates with or accesses service provider network 10. Access node 16 can be, for example, an optical network terminator (ONT). In embodiments involving other access technologies or network technologies it could be any other suitable type of network node, such as a digital subscriber line access multiplexer (DSLAM).

As is known in the art, and as described below in further detail, a communication conversation (i.e., an exchange of messages) occurs between residential gateway 14 and access node 16 and between access node 16 and authentication server 18 during the authentication process that must occur before residential gateway 14 can communicate normally with service provider network 10. As also known in the art, DHCP server 20 dynamically provides an IP address to CPE 14 in response to a request received from CPE 14. If CPE 14 successfully obtains such an IP address and is successfully authenticated, then absent any other unexpected problems or malfunctions, CPE 14 is able to communicate normally with service provider network 10 (via access node 16). In normal operation, CPE 14 can use service provider network 10 to access the Internet (not shown), conduct voice (telephony) communication, receive video (television) entertainment, etc.

Figure 2:
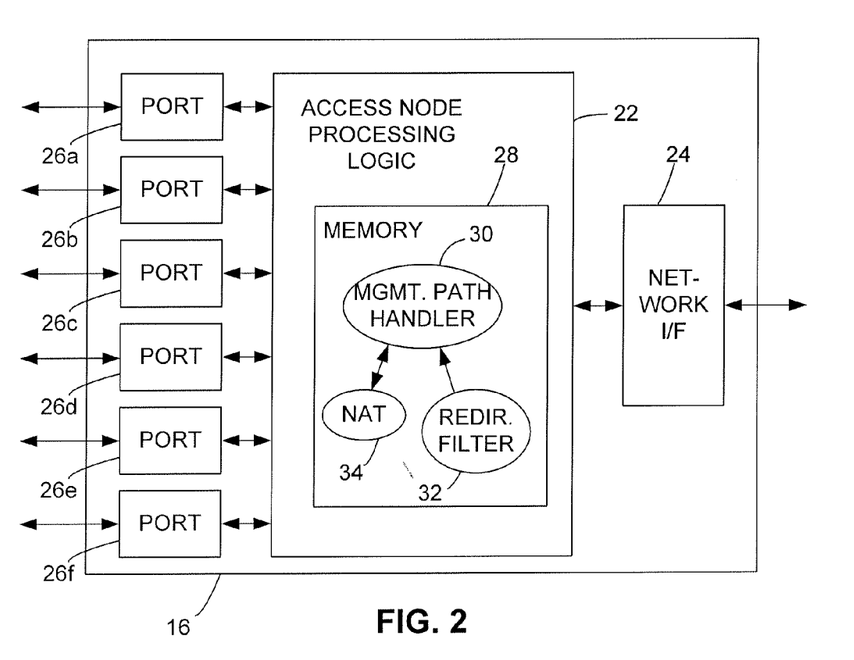
FIG. 2 is a block diagram of a generalized access node of the network of FIG. 1.

Access node 16 can have the structure illustrated in generalized form in FIG. 2, including processing logic 22, a network interface 24, and a number of physical ports 26 (individually identified as 26a-26f). Access node 16 communicates with service provider network 10 (FIG. 1) via network interface 24 and with customer premises equipment (e.g., residential gateway 14) via ports 26. Processing logic 22 can comprise any suitable "logic," i.e., hardware, software, firmware, or some combination thereof, including processors and data storage, of the types commonly included in access nodes or similar network devices. As persons skilled in the art to which the invention relates can appreciate, processing logic 22, as well as network interface 24 and ports 26, can be included in one or more application-specific integrated circuits (ASICs), gate arrays, or other suitable devices.

Depicted for purposes of illustration and convenience as residing in a memory 28 of processing logic 22 are a management path handler 30, a redirection filter 32, and a network address translator 34. As redirection filters are well known in the art, redirection filter 32 is not described in further detail in this patent specification except to note that it detects incoming (from service provider network 10) data packets having destination addresses in a predetermined group of management path addresses and redirects them to management path handler 30 instead of passing them through to one of ports 26 as would conventionally occur in an access node. For example, the group of management path IP addresses can be in the private address range "10.x.x.x", where "x" represents a number that the sender can select to address a specific one of the residential gateways serviced by the network service provider. This format for the management path IP addresses is intended only as an example, and others will readily occur to persons skilled in the art. For example, it may be advantageous not to divide the numbers ("octets" in the IP lexicon) along byte boundaries for scalability. Also, in some embodiments of the invention, the management path addresses can include other information in addition to the IP address, such as a virtual LAN (VLAN) tag. Addressing the management path as a VLAN or, similarly, as a virtual private network (VPN) can provide additional security.

Network address translator (NAT) 34 is a software process or similar logic that translates one address into another in accordance with one or more predetermined tables. The NAT function is well-known in telecommunications equipment such as routers, and NAT software is commercially available from a variety of sources.

In operation, a processor (not shown for purposes of clarity) can execute or otherwise utilize the above-described software elements to effect the access node functions described below. In addition or alternatively, the processor can use other software elements (not shown) that are commonly included in access nodes and similar network devices. Although management path handler 30, redirection filter 32, and NAT 34 are conceptually depicted as residing in memory 28 for purposes of illustration and convenience, persons skilled in the art to which the invention relates will appreciate that, like other software elements that are typically included in access nodes, in actuality they do not necessarily reside in memory simultaneously or in their entireties, and their functions may alternatively be performed by other software, hardware or firmware elements (not shown) or included in combination with functions of other elements. Such other configurations or architectures will occur readily to persons skilled in the art in view of the teachings herein.

Figure 3:
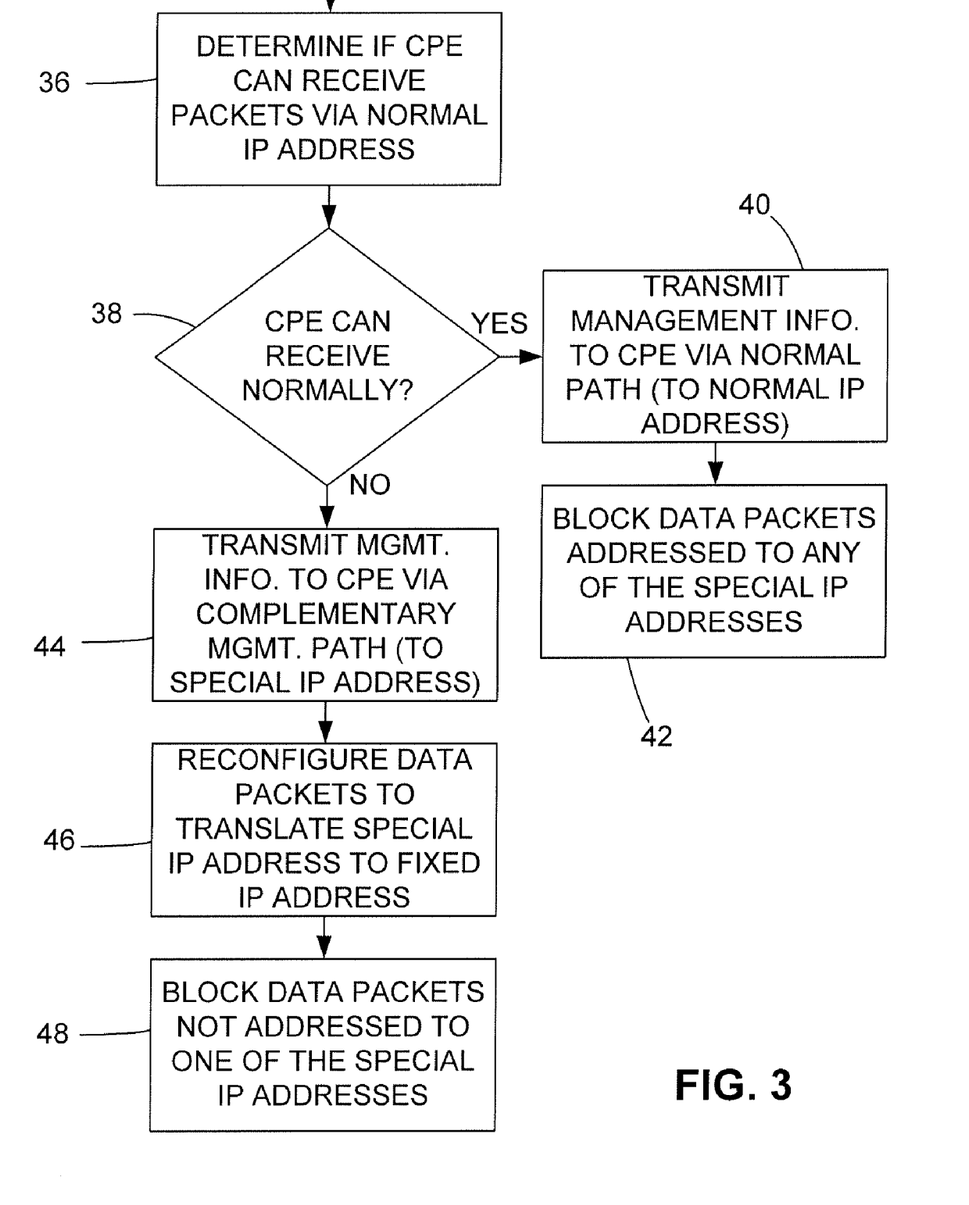
FIG. 3 is a flow diagram illustrating a method of operation of the network of FIGS. 1-2.

The flow diagram of FIG. 3 illustrates an exemplary method operation of the system of FIG. 1 in an instance in which it is deemed necessary or desirable to remotely perform management functions upon a residential gateway. For example, a customer (subscriber) may contact the service provider to alert the service provider that the customer is not properly receiving service. In response, the service provider may wish to perform diagnostic tests upon the customer's residential gateway (RG) 14 or update the software of RG 14. A service provider may choose to perform such management functions or other management functions on RG 14 at other times as well. The management functions can be any known in the art for remotely updating, servicing or otherwise managing customer premises equipment, computers, network devices, etc. Service technicians, customer service representatives, or other personnel of the service provider can use system management server 21 to initiate the management functions, or alternatively, server 21 or an associated device can initiate management functions automatically without human intervention. In the illustrated embodiment, regardless of how the management functions are initiated, system management server 21 produces management information that is to be transmitted to RG 14 to perform the management functions upon RG 14.

At step 36, it is determined whether RG 14 is in a state that enables normal communication with service provider network 10. If RG 14 has been authenticated and assigned a normal IP address through DHCP, it can be expected to be in a state in which it can communicate (data packets) normally with service provider network 10. (The term "normal" or "normally" as used herein, refers to communication via the type of path through which information of the type to which the customer subscribes (e.g., Internet data, voice, video entertainment, etc.) is conventionally transmitted, rather than a path through which management information or other peripherally related information is conventionally transmitted. Information is normally transmitted to a residential gateway only if it has obtained an IP address using DHCP or a similar address allocation method.) If authentication or the DHCP process fails unexpectedly, or if RG 14 is otherwise malfunctioning, the customer may have contacted the service provider (e.g., via a telephone call to a customer service call center) and asserted that RG 14 is not operating properly. In such an instance, the service provider can determine, from the customer's description of the problem or from any diagnostic tests that the service provider is able to perform remotely, whether RG 14 is in a state that enables normal communication with service provider network 10. In other embodiments of the invention, the determination whether the residential gateway or other customer premises equipment is in a state in which it can communicate normally can be made in any other suitable manner and by any other suitable means.

If, as indicated by step 38, RG 14 is in a state in which it can communicate via a normal path, then at step 40 system management server 21 (FIG. 1) transmits management information to RG 14. As RG is in a state in which it can communicate normally, the management information can be in the form of data packets addressed to the normal IP address that RG 14 has been assigned, in the same manner as service provider network 10 would ordinarily transmit any other information (e.g., Internet data, voice, video entertainment, etc.) to RG 14. In other words, if RG 14 can communicate via a normal path, it is not necessary to use the complementary management path.

Access node 16 (FIG. 1) receives data packets from other portions of service provider network 10, including system management server 21. Access node 16 can determine whether RG 14 has been successfully authenticated and allocated an IP address, as it is involved in those processes. Thus, access node 16 also can generally (i.e., absent an unusual malfunction) determine whether RG 14 is in a state in which it can communicate normally. At step 42, access node 16 blocks any data packets that may be addressed to one of the management path addresses because it has determined that RG 14 can communicate via a normal path, and blocking the use of the management paths when they are not needed can enhance security. Nevertheless, it is not necessary to block the management paths, and step 42 can be omitted in other embodiments of the invention. It should also be noted that in some embodiments of the invention, management information is always transmitted via the management paths instead of the normal paths, and steps 36-42 are omitted in such embodiments.

Figure 4:
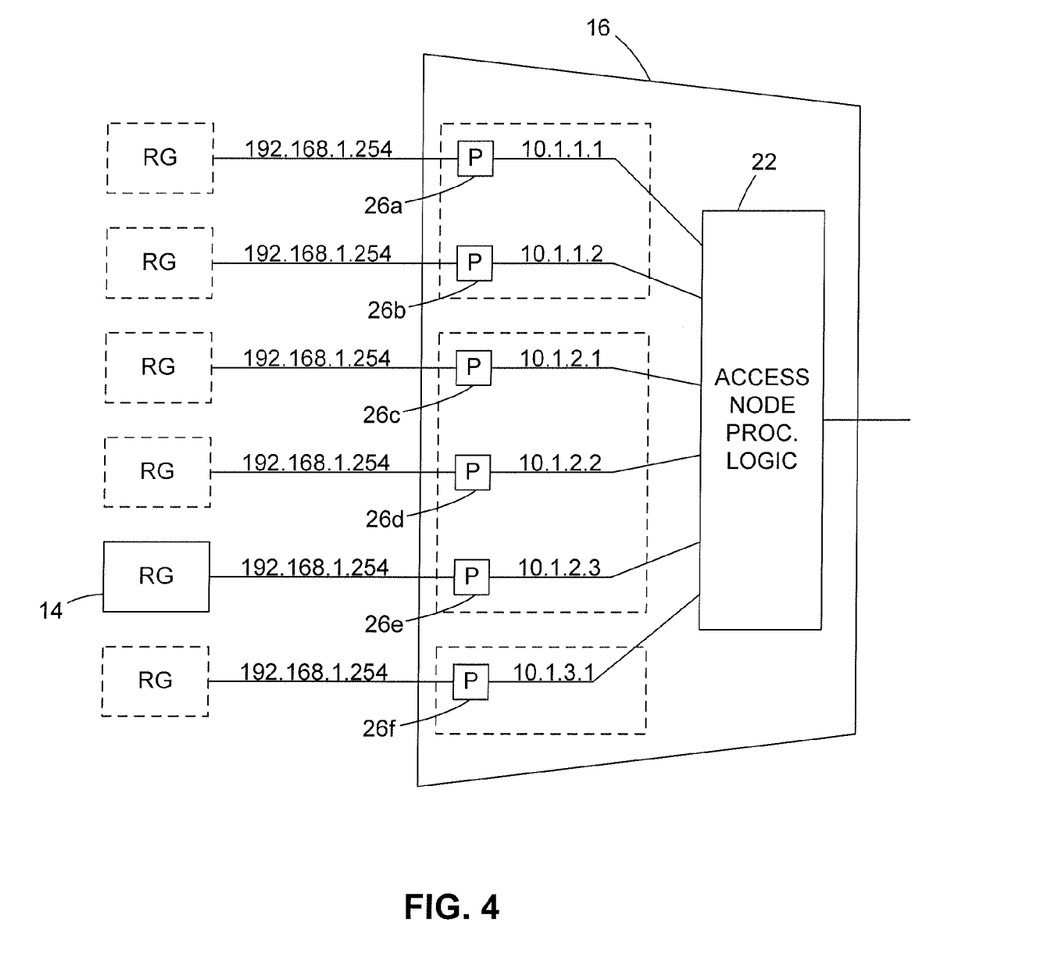
FIG. 4 is a data path diagram illustrating complementary management data paths in accordance with the exemplary embodiment.

If, as indicated by step 38, RG 14 is in not a state in which it can communicate via a normal path, then at step 44 system management server 21 (FIG. 1) transmits management information to RG 14 in the form of packets addressed to the one of the management path addresses that uniquely identifies RG 14 (i.e., it excludes other residential gateways in the network, indicated in dashed line in FIG. 1). As described above, in this exemplary embodiment of the invention, the group of management path IP addresses can have the form "10.x.x.x". Referring briefly to FIG. 4, the management path address that uniquely identifies RG 14 can be, for example, 10.1.2.3, where the "10" identifies the private address range for the packet as containing residential gateway management information, the next number ("1") uniquely identifies access node 16 (i.e., it excludes other access nodes (not shown) in the network), the next number ("2") uniquely identifies the slot (indicated in dashed line) in access node 16 in which the port to which RG 14 is connected is located, and the last number ("3") identifies the port (26e in FIGS. 2 and 4). These divisions of the address into port, slot, etc., are intended merely to be exemplary, and others will readily occur to persons skilled in the art in view of the teachings herein. Also, as noted above, the management address can include additional information, such as a unique VLAN or VPN tag identifying the packet as containing management information for this network or portion thereof. As a result of this addressing format, access node 16 associates RG 14 with any received packets having as their destination address 10.1.2.3 because RG 14 is the only customer premises equipment that is connected to port 26e. Note that the connection represented in FIG. 4 can be physical or, alternatively, logical.

Returning to FIG. 3, at step 46 the addressed port 26e at which the packet bearing the management information arrives reconfigures the packet by translating the management path address into a predetermined, fixed address. As described above, port 26e can invoke NAT 34 to perform the address translation. Note that although from a logical or conceptual perspective it can be said that the port 26 that received the packet reconfigures the packet, those skilled in the art will recognize that processes in an access node or similar network device are generally controlled by centralized processing logic (e.g., access node processing logic 22). In the illustrated embodiment of the invention, each residential gateway in the network has a local port that can be addressed by the same predetermined, fixed IP address as all other residential gateways. In the example shown in FIG. 4, the predetermined, fixed IP address shared by the residential gateways is 192.168.1.254, but any other suitable IP address can be used. Such a local IP address is used conventionally for locally managing the residential gateway. For example, it enables a customer to install software (locally, through the user's computer that is connected to the residential gateway) or technicians to perform maintenance (again, locally, using a computer connected to the residential gateway). The terms "predetermined" and "fixed" in the context of this IP address means that the address is integral to the residential gateway, provided during provisioning or manufacture of the residential gateway, and does not change during normal operation or upon startup (i.e., it is a static address, in contrast to the dynamic IP address allocated to the residential gateway upon beginning operation). Also, the predetermined, fixed address that is conventionally used for locally managing the residential gateway is not registrable on the Internet, and Internet routers do not recognize it.

As the predetermined, fixed address is recognized by RG 14, which is connected to port 26e, it is able to receive the reconfigured management information data packets and extract the management information. The management information causes RG 14 to perform the management functions. As described above, this can include, for example, updating its software with new software (also included in the management information) or causing RG 14 to perform self-diagnostic tests and report results back to system management server 21. Although in the exemplary embodiment of the invention system management server 21 (FIG. 1) is the source of the management information, in other embodiments any other suitable device with access to service provider network 10 can be the source of the management.

At step 48, access node 16 blocks any data packets that are not addressed to any of the management path addresses in the group from reaching RG 14, so as to enhance security, until such time as RG 14 becomes capable of communicating via a normal path. This step is shown following step 46 for purposes of illustration and convenience and can occur in parallel with other steps. Similarly, unless stated otherwise or clearly indicated otherwise by the context, the steps described above can occur in any suitable order and at any suitable time.

Although not described with regard to the exemplary method of operation illustrated by the flow diagram of FIG. 3, it should be noted that communication of management information between system management server 21 and RG 14 (FIG. 1) can be bidirectional. Thus, port 26e can similarly invoke NAT 34 to perform the address translation on packets destined for system management server 21.

In the manner described above, the present invention provides a management path to customer premises equipment that complements the path through which a service provider normally transmits information. The service provider can use such complementary management paths in many instances to service or otherwise manage residential gateways or other customer premises equipment even if the equipment cannot be reached via normal paths due to failure of authentication, allocation of an IP address, or other reasons.

It will be apparent to those skilled in the art that various modifications and variations can be made to this invention without departing from the spirit or scope of the invention. Thus, it is intended that the present invention cover the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method for communicating management information with a destination residential gateway as a customer premises equipment (CPE) in a digital subscriber network, comprising:
    transmitting the CPE management information as data packets addressed to a selected one of a plurality of predetermined management path addresses exclusively associated with CPE management in the network, each management address of the plurality uniquely identifying one of a plurality of CPE's in the network;
    reconfiguring the data packets to translate the selected one of the plurality of management path addresses to a predetermined fixed address, the predetermined fixed address being common to the plurality of CPE's in the network and the predetermined fixed address is a private Internet Protocol address for locally managing the residential gateway and the predetermined fixed address is a private Internet Protocol address for locally managing the CPE;
    transmitting the CPE management information to a destination CPE as reconfigured data packets addressed to the predetermined fixed address; and
    determining if the destination CPE is in an enabling state enabling communication with the network via a dynamically assigned address, wherein the step of transmitting the CPE management information as data packets addressed to a selected one of a plurality of predetermined management path addresses is performed if the destination CPE is not in the enabling state.

2. The method claimed in claim 1, further comprising the step of blocking transmission to the destination CPE of all data packets not addressed to one of the plurality of predetermined management path addresses while the CPE is not in the enabling state.

3. The method claimed in claim 2, further comprising the steps of:
    transmitting the CPE management information as data packets addressed to a dynamically assigned address if the destination CPE is in the enabling state; and
    blocking transmission to the destination CPE of all data packets addressed to one of the plurality of predetermined management path addresses while the destination CPE is in the enabling state.

4. The method claimed in claim 2, wherein the step of determining if the destination CPE is in the enabling state comprises determining if the CPE has been authenticated and has been dynamically assigned an Internet Protocol (IP) address.

5. The method claimed in claim 4, further comprising the steps of:
    transmitting the CPE management information as data packets addressed to a dynamically assigned address if the destination CPE is in the enabling state; and
    blocking transmission to the destination CPE of all data packets addressed to one of the plurality of predetermined management path addresses while the destination CPE is in the enabling state.

6. An access node providing management paths complementary to normal data paths in a digital subscriber network, comprising:
    a network interface for interfacing with a service provider network and receiving customer premises equipment (CPE) management information;
    a plurality of CPE ports through which information can be communicated with customer premises equipment; and
    access node processing logic having a management path handler and an address translator, the access node receiving the CPE management information via the network interface as data packets addressed to a selected one of a plurality of predetermined management path addresses exclusively associated with CPE management in the network, each management address of the plurality uniquely identifying one of a plurality of CPE's in the network, the management path handler reconfiguring the data packets to translate the selected one of the plurality of management path addresses into a predetermined fixed address, the predetermined fixed address being common to the plurality of CPE's in the network, and the access node transmitting the CPE management information to a destination CPE as reconfigured data packets addressed to the predetermined fixed address, wherein the management path handler determines if the destination CPE is in an enabling state enabling communication with the network via a dynamically assigned address and blocks transmission to the destination CPE of all data packets not addressed to one of the plurality of predetermined management path addresses while the destination CPE is not in the enabling state.

7. The access node claimed in claim 6, wherein the management path handler determines if the destination CPE is in the enabling state by determining if the CPE has been authenticated and has been dynamically assigned an Internet Protocol (IP) address.

8. The access node claimed in claim 6, wherein the management path handler determines if the destination CPE is in an enabling state enabling communication with the network via a dynamically assigned address and blocks transmission to the destination CPE of all data packets addressed to one of the plurality of predetermined management path addresses while the destination CPE is in a state enabling communication with the network via a dynamically assigned address.

9. The access node claimed in claim 8, wherein the management path handler determines if the destination CPE is in the enabling state by determining if the CPE has been authenticated and has been dynamically assigned an Internet Protocol (IP) address.

10. A computer program product for enabling management paths complementary to normal data paths in a digital subscriber network through an access node, the computer program product comprising:
    a memory for storing code portions for execution by a processor;
    code for detecting received data packet destination addresses identifying selected ones of a plurality of predetermined management path addresses exclusively associated with customer premises equipment (CPE) management in the network, each management address of the plurality uniquely identifying one of a plurality of CPE's in the network;

code for reconfiguring data packets to translate data packet destination addresses identified as being of the plurality of management path addresses into a predetermined fixed address, the predetermined fixed address being common to the plurality of CPE's in the network;

code for causing the access node to transmit the CPE management information to a destination CPE as reconfigured data packets addressed to the predetermined fixed address; and code for determining if the destination CPE is in an enabling state enabling communication with the network via a dynamically assigned address.

11. The computer program product claimed in claim 10, further comprising:

code for blocking transmission to the destination CPE of all data packets not addressed to one of the plurality of predetermined management path addresses while the CPE is not in the enabling state.

12. The computer program product claimed in claim 11, wherein the code for determining if the destination CPE is in enabling state determines if the CPE has been authenticated and has been dynamically assigned an Internet Protocol (IP) address.

13. The computer program product claimed in claim 10, further comprising:

code for blocking transmission to the destination CPE of all data packets addressed to one of the plurality of predetermined management path addresses if the destination CPE is in the enabling.

14. The computer program product claimed in claim 13, wherein the code for determining if the destination CPE is in the enabling determines if the CPE has been authenticated and has been dynamically assigned an Internet Protocol (IP) address.

* * * * *

UNITED STATES PATENT AND TRADEMARK OFFICE
CERTIFICATE OF CORRECTION

| | |
|---|---|
| PATENT NO. | : 7,590,129 B2 |
| APPLICATION NO. | : 11/383781 |
| DATED | : September 15, 2009 |
| INVENTOR(S) | : Absillis |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 639 days.

Signed and Sealed this
Tenth Day of May, 2011

David J. Kappos
*Director of the United States Patent and Trademark Office*